United States Patent
Kosiba

(10) Patent No.: US 9,130,799 B2
(45) Date of Patent: Sep. 8, 2015

(54) SYSTEM AND METHOD FOR EFFECTUATING PLAYLIST SEEKING WITH RESPECT TO DIGITAL MULTIMEDIA CONTENT FROM A NETWORK NODE

(75) Inventor: David Kosiba, Jamul, CA (US)

(73) Assignee: Alcatel Lucent, Boulogne-Billancourt (FR)

(*) Notice: Subject to any disclaimer, the term of this patent is extended or adjusted under 35 U.S.C. 154(b) by 2189 days.

(21) Appl. No.: 11/909,407

(22) PCT Filed: Mar. 16, 2006

(86) PCT No.: PCT/US2006/009536
§ 371 (c)(1),
(2), (4) Date: Sep. 21, 2007

(87) PCT Pub. No.: WO2006/101988
PCT Pub. Date: Sep. 28, 2006

(65) Prior Publication Data
US 2009/0094376 A1    Apr. 9, 2009

(51) Int. Cl.
*G06F 15/16* (2006.01)
*H04L 29/06* (2006.01)
*H04N 7/173* (2011.01)
*H04N 21/262* (2011.01)
*H04N 21/6377* (2011.01)
(Continued)

(52) U.S. Cl.
CPC ...... *H04L 29/06027* (2013.01); *H04L 65/4092* (2013.01); *H04L 65/607* (2013.01); *H04N 7/17336* (2013.01); *H04N 21/26258* (2013.01); *H04N 21/6377* (2013.01); *H04N 21/6437* (2013.01); *H04N 21/8455* (2013.01)

(58) Field of Classification Search
None
See application file for complete search history.

(56) References Cited

U.S. PATENT DOCUMENTS

| 8,843,596 B2 * | 9/2014 | Goel et al. ............. 709/219 |
| 2002/0040366 A1 * | 4/2002 | Lahr ..................... 707/101 |

(Continued)

FOREIGN PATENT DOCUMENTS

| JP | 2003018567 A | 1/2003 |
| JP | 2003304523 A | 10/2003 |
| WO | 2004073309 A1 | 8/2004 |

OTHER PUBLICATIONS

Schulzrinne, et al.; Real Time Streaming Protocol (RTSP); Network Working Group; RFC 2326; Apr. 1998; pp. 1-92.
(Continued)

*Primary Examiner* — Rehana Perveen
*Assistant Examiner* — Raheem Hoffler
(74) *Attorney, Agent, or Firm* — Garlick & Markison

(57) ABSTRACT

A system and method for effectuating playlist seeking capability with respect to digital media content from a network node. A Real-Time Streaming Protocol (RTSP) Uniform Resource Locator (URL) or a Session Description Protocol (SDP) file including a set of appropriate play list-related control attributes is provided when a media user invokes a streaming session. Responsive to the RTSP URL or SDP file, an RTSP message is provided to the network node from the media user, the RTSP message including selected playlist-related control attributes in a URL query string associated with the identified playlist. In particular, the selected playlist-related control attributes include a clip index (that indexes into the playlist to identify a particular media clip) and an offset (that indicates a start time within the identified media clip) at which to commence streaming to enable more versatile seeking capability.

13 Claims, 6 Drawing Sheets

(51) Int. Cl.
*H04N 21/6437* (2011.01)
*H04N 21/845* (2011.01)
*G06F 17/30* (2006.01)

(56) References Cited

U.S. PATENT DOCUMENTS

| | | | |
|---|---|---|---|
| 2002/0118300 A1* | 8/2002 | Middleton et al. | 348/569 |
| 2003/0018966 A1 | 1/2003 | Cook et al. | |
| 2003/0236905 A1* | 12/2003 | Choi et al. | 709/231 |
| 2003/0236907 A1 | 12/2003 | Stewart et al. | |
| 2003/0236912 A1* | 12/2003 | Klemets et al. | 709/236 |
| 2005/0144305 A1* | 6/2005 | Fegan et al. | 709/231 |
| 2007/0156716 A1* | 7/2007 | Said et al. | 707/100 |
| 2008/0064378 A1* | 3/2008 | Kahan et al. | 455/414.1 |
| 2008/0189295 A1* | 8/2008 | Khedouri et al. | 707/10 |

OTHER PUBLICATIONS

India Patent Office; Examination Report; Application No. 7376/DELNP/2007; May 19, 2015.

* cited by examiner

SYSTEM AND METHOD FOR EFFECTUATING PLAYLIST SEEKING WITH RESPECT TO DIGITAL MULTIMEDIA CONTENT FROM A NETWORK NODE

BACKGROUND OF THE INVENTION

1. Technical Field of the Invention

The present invention generally relates to media streaming over a network. More particularly, and not by way of any limitation, the present invention is directed to a system and method for effectuating playlist seeking with respect to digital media content from a network node in a client-server architecture.

2. Description of Related Art

With today's widespread use of the Internet as a major communication medium, computer networks are increasingly being used to transmit multimedia data (e.g., audio, full-motion video, pictures, et cetera). In the network-based context, one simple model of producing the information involves a client device requesting the downloading of the multimedia data from a server. Once downloaded, the client may then consume, or present, the information. This model is relatively easy to implement; however, it is non-optimal in that the client is required to wait for the downloading to complete before the presentation can begin. This delay can be considerable where large blocks of multimedia data are involved.

A more sophisticated model of producing information involves a content server at one network site "streaming" the multimedia information over the network to a client at another site. Streaming is a process in which packets, sent over an Internet Protocol (IP)-based network, are used to present material continuously to a recipient client as it arrives in substantially real time as perceived by the user. As such the client does not have to download and store a large file before displaying the material. That is, the client begins to present the information as it arrives (i.e., just-in-time rendering), rather than waiting for the entire data set to arrive before beginning presentation. Accordingly, at the client device, received data is buffered into a cache memory and continuously processed as soon as, or soon after, being received by the client for real time presentation of multimedia content.

Most streaming sessions include either live or video-on-demand (VOD) sources, and are typically associated with a single content source (i.e., a single VOD file or a single live source, e.g., a video camera). However, by adding the ability to combine sources into a single streaming session, much richer applications can be built based on multimedia streaming.

A "playlist" in its simplest form is just a list of media which could be used to simply manage playback of local content (i.e., audio files) or to control the streaming media sessions. When used in the context of multimedia streaming, playlists provide an extensible, dynamic method for delivering customizable audio and video content to users via streaming. A playlist represents a list of the media items that a server can stream to a client, which can include a mixture of program content and advertisements (ads), for example. Also, a playlist can be used to play several short clips or to provide a user with long blocks of programming.

In a client-server streaming architecture, two types of playlists may be provided: client-side playlists and server-side playlists. The main difference between the two types of playlists is that when the client-side playlists are used, a client player application has control of the streaming experience, whereas when server-side playlists are used, a streaming server has control of the streaming experience. Server-side playlists provide the ability for the streaming server to combine streams from multiple sources (in sequence) and stream to a client in a single session. The client need not (and may not even) be aware that there are multiple media sources. This is useful for providing ad insertion capability, or for applications where uninterrupted streaming (from multiple sources) is desired—i.e., where the client doesn't have to explicitly request streaming from each new source.

One of the issues when utilizing server-side playlists is to support playlist navigation, which is advantageous in providing the end-user with a compelling and useful user experience. Additionally, the playlist navigation functionality must be accomplished with minimal impact on the client device application due to significant client device resource constraints. Existing server-side playlist schemes, however, are deficient in that they do not support client-side navigational control of playlist seeking.

SUMMARY OF THE INVENTION

Broadly, the embodiments of the present disclosure are directed to a scheme for effectuating enhanced playlist seeking capability with respect to digital media content from a network node, whereby a user can start a playlist at any media clip therein. A Real-Time Streaming Protocol (RTSP) Uniform Resource Locator (URL) or Session Description Protocol (SDP) file including a set of appropriate playlist-related control attributes is provided when the user invokes a streaming session on a suitable digital media player. Responsive to the RTSP URL or SDP file, an RTSP message is provided to the network node, the RTSP message including the playlist-related control attributes in a URL query string associated with the identified playlist. In particular, a clip index (that indexes into the playlist to identify a particular media clip) and an offset (the start time within the identified media clip) are provided as the playlist-related control attributes to enable more versatile seeking capability.

In one aspect, the present invention is directed to a method for effectuating playlist seeking with respect to digital media content from a network node, comprising: providing a set of appropriate playlist-related control attributes associated with a playlist via at least one of an SDP file and an RTSP URL; responsive to the received playlist-related control attributes, providing an RTSP message to a server stream module associated with the network node by a media player engine executing on a digital multimedia device, the RTSP message containing the playlist-related control attributes in a URL query string associated with the RTSP message with respect to the playlist; and commencing a streaming session of the playlist identified in the RTSP message, wherein starting of a particular media clip within the playlist and an offset into the particular media clip are specified based on the playlist-related control attributes.

In another aspect, the present invention is directed to a system for effectuating playlist seeking with respect to digital media content from a network node, comprising: means for providing a set of appropriate playlist-related control attributes associated with a playlist via at least one of an SDP file and an RTSP URL; means associated with a media player engine executing on a digital multimedia device, the means operating responsive to the received playlist-related control attributes for providing an RTSP message to a server stream module associated with the network node, the RTSP message containing the playlist-related control attributes in a URL query string associated with the RTSP message with respect to the playlist; and means for commencing a streaming session of the playlist identified in the RTSP message, wherein starting of a particular media clip within the playlist and an offset into the particular media clip are specified based on the playlist-related control attributes.

In yet another aspect, the present invention is directed to a digital media device operable to retrieve digital media content from a network node, comprising: logic associated with a media player engine executing on the digital media device for generating an RTSP message to the network node, the RTSP message containing a set of playlist-related control attributes in a URL query string with respect to a playlist identified in the RTSP message; and means associated with the media player engine for playing back the playlist identified in the RTSP message, wherein starting of a particular media clip within the playlist and an offset into the particular media clip are specified based on the playlist-related control attributes.

BRIEF DESCRIPTION OF THE DRAWINGS

The accompanying drawings are incorporated into and form a part of the specification to illustrate one or more presently preferred exemplary embodiments of the present invention. Various advantages and features of the invention will be understood from the following Detailed Description taken in connection with the appended claims and with reference to the attached drawing figures in which:

DETAILED DESCRIPTION OF THE DRAWINGS

Figure 1:
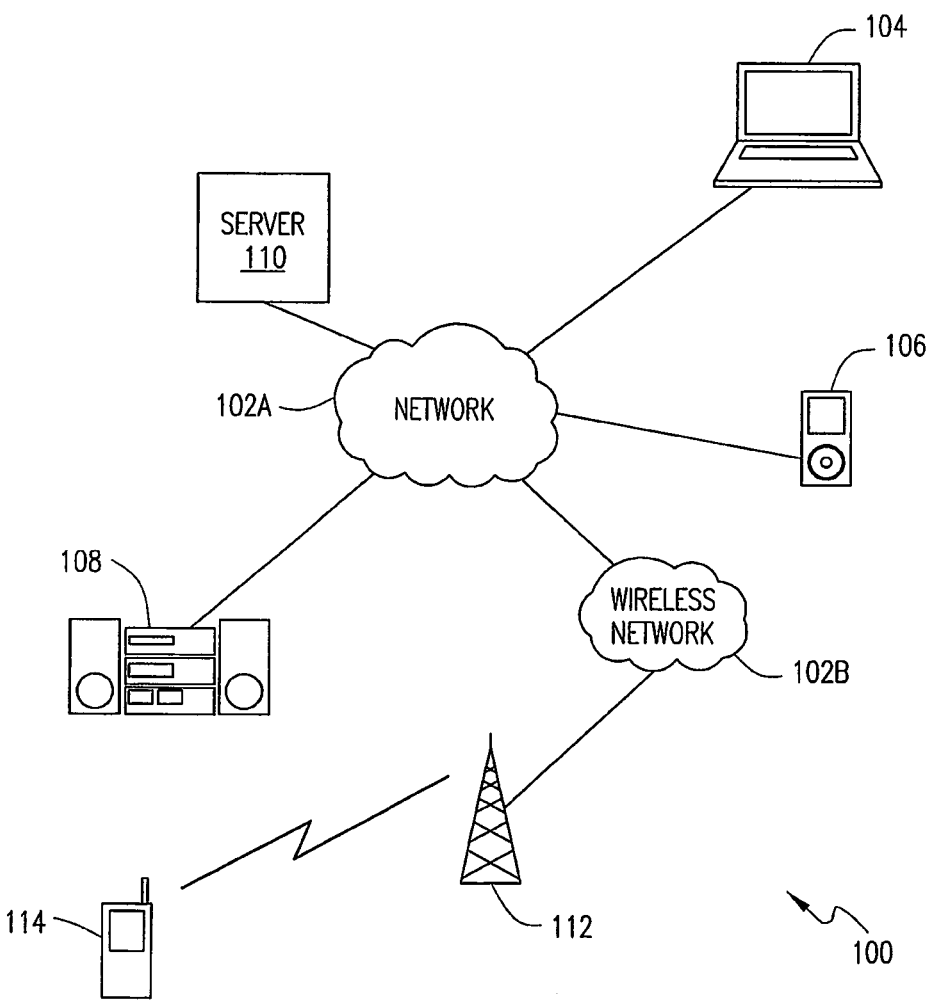
FIG. 1 depicts an exemplary network environment in which an embodiment of the present invention may be practiced.

Embodiments of the invention will now be described with reference to various examples of how the invention can best be made and used. Like reference numerals are used throughout the description and several views of the drawings to indicate like or corresponding parts, wherein the various elements are not necessarily drawn to scale. Referring now to the drawings, and more particularly to FIG. 1, depicted therein is an exemplary network environment 100 in which an embodiment of the present invention may be practiced. Reference numerals 102A and 102B are illustrative of a network infrastructure that can include, among others, any wireline, wireless, satellite, or cable network arrangement, or a combination thereof, that can support transfer of digital multimedia content from a server node 110 to various client devices capable of accepting such content over a client-server network architecture. In one implementation, network 102A may comprise a public packet-switched network such as the Internet that is accessible via suitable access means including both narrowband (e.g., dial-up) and broadband (e.g., cable, digital subscriber line or DSL, etc.) access mechanisms. Alternatively, network 102A may be implemented as a private enterprise-level intranet. Wireless network 102B may be implemented as a wireless packet data service network such as the General Packet Radio Service (GPRS) network that provides a packet radio access for mobile devices using the cellular infrastructure of a Global System for Mobile Communications (GSM)-based carrier network. In still further implementations, the wireless network 102B may comprise any known or heretofore unknown $3^{rd}$ Generation Partnership Project (i.e., 3GPP, 3GPP2, etc.) network operable to serve Internet Protocol (IP)-capable handheld devices, e.g., a mobile client device 114, using appropriate wireless infrastructure 112 that includes, among others, short-range wireless fidelity (WiFi) access points (APs) or "hot spots." As will be seen hereinbelow, the embodiments of the present patent application for retrieving server-based digital multimedia content by a client device will be described regardless of any particular wireless or wireline network implementation of the networks 102A, 102B.

Although the server node 110 is illustrated as a single node coupled to the network 102A, its functionality may be distributed among a plurality of nodes depending on the underlying streaming media architecture. Exemplary client devices can be thick or thin clients, with varying levels of processing power, operable execute appropriate streaming client applications that can include Java applications, plug-ins, etc. Client devices may comprise portable computers, laptops, handheld computers, desktop computers, generically represented as computers 104, network-aware audio/video (A/V) devices such as digital music players, digital video players, etc., generally represented as A/V components 108, or specialized multimedia devices 106 such as iPod™ devices and the like. Further, as alluded to before, client devices can also include mobile client devices (e.g., device 114) that are capable of accepting and playing digital multimedia content.

Figure 2:
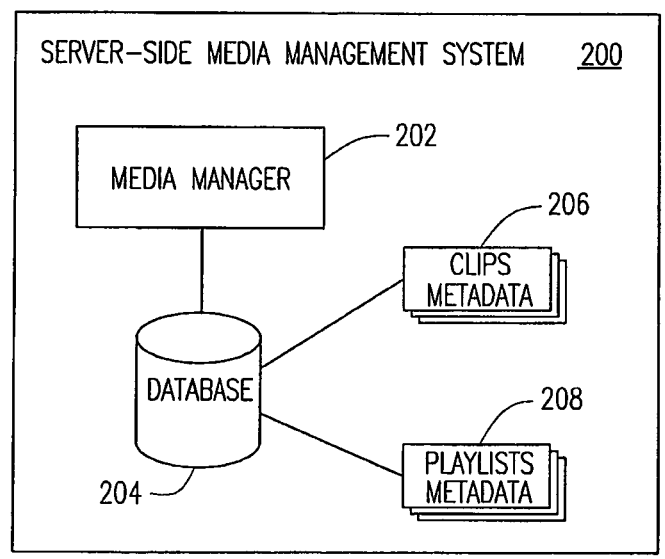
FIG. 2 depicts an exemplary embodiment of a server-side media management system operable in accordance with an embodiment of the present invention.

FIG. 2 depicts an exemplary embodiment of a server-side media management system 200 associated with a server (e.g., the server node 110) in accordance with an embodiment of the present invention. The server-side media management system 200 may include a media manager 202 and a digital multimedia content database 204 wherein the media manager 202 controls access to the database 204. In one implementation, the media manager 202 receives requests from a client application executing on a digital multimedia device, accesses the content database, and returns responses to the client application. As will be described below, the database 204 serves as a depository of digital multimedia content that is organized into a nested hierarchical arrangement having a plurality of levels based on parameters that are used to classify, identify and/or describe media (i.e., media items) in the database 204. For instance, the digital multimedia content associated with the server may contain music files that can be streamed over the network under control of a suitable text-based protocol such as the Real-Time Streaming Protocol (RTSP). It should be appreciated that other media files may comprise any form of digital media, which can include sound files, picture data, movies, text files or any other types of media that can be digitally stored on a computer. Accordingly, server-side playlists can be generalized to media collections, including collections of mixed digital media, each playlist including one or more individual multimedia files or clips. The media manager 202 has or can obtain information about the database 204 that may, for example, include the name of the server, the version of the database being used, the type of security that is required, the number of databases available to the server, whether non-standard media types are supported, whether persistent identification is supported, etc. Those skilled in the art should appreciate that the information about the database 204 may exist in a single record file or can be either partially or fully generated on demand, identifying the various pieces of information as needed. One or more metadata files 206 contain metadata about each media item available in the database 204. By way of illustration, where the media item is a song, the metadata might include, for example, the names or titles of songs, an identification number, a persistent identification number, the artist, the album, the size of the song, the format of the song, the required bit rate, and any other appropriate information, which may depend on the type of media. A video file might have additional fields, e.g., director and producer fields, actor and actress fields, etc. Still pictures may not need bit rate information. While some fields may be standard, others may be specific to certain applications. For example, a video signal may have secondary audio program (SAP) information in addition to other video-related metadata information.

The playlist records 208 contain information about each playlist available in the database 204, wherein the playlists are typically comprised of collections of media clips that may or may not be in any particular order. Users may choose to combine media by genre, mood, artists, directors/producers, audience, or any other meaningful arrangement. While the playlists on the server 110 will usually only include media clips contained in its own music database 204, it is also possible that the playlist records 208 may include multimedia clips or playlists stored on other servers, depending upon the implementation of the server-side media management system 200.

Figure 3:
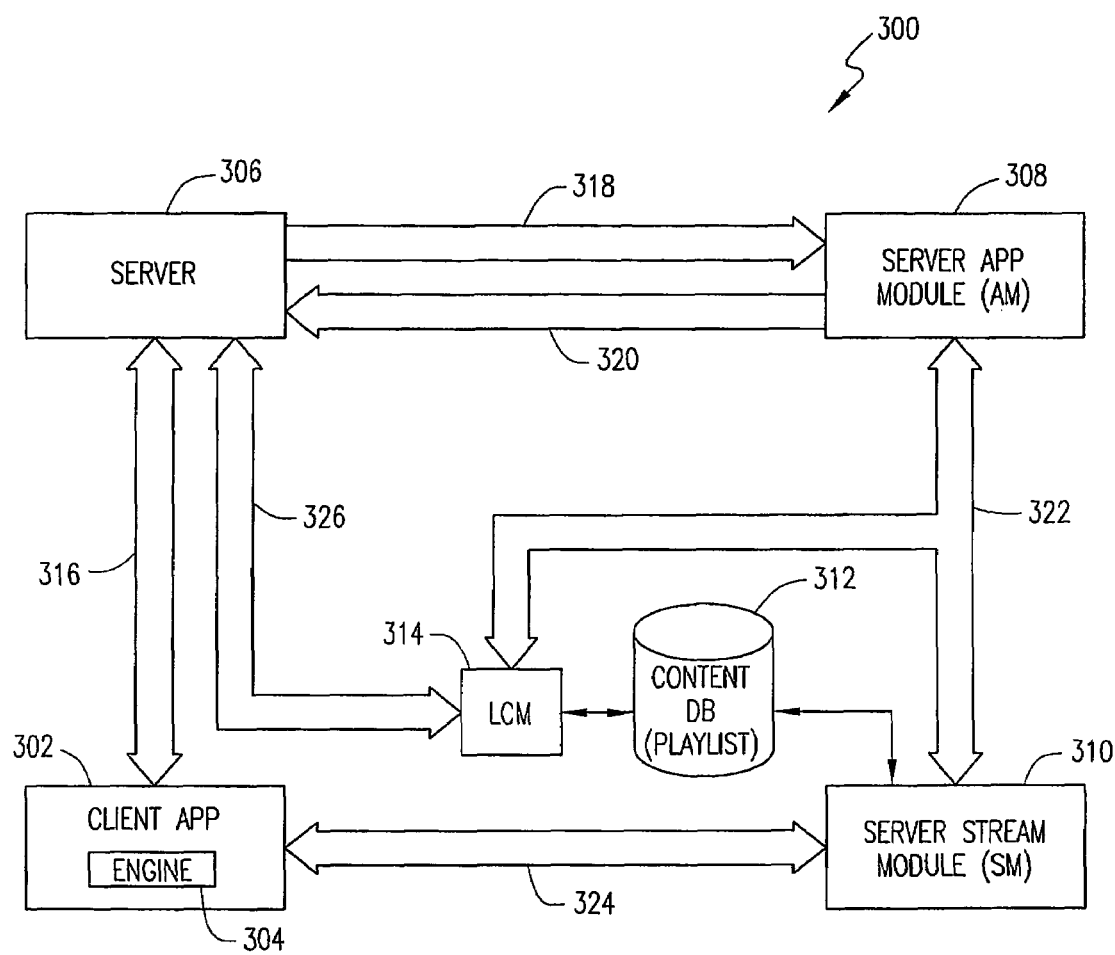
FIG. 3 depicts a block diagram of a client-server arrangement operable in a network environment for streaming digital multimedia content in accordance with an embodiment of the present invention.

FIG. 3 depicts a block diagram of an exemplary client-server arrangement 300 operable in a network environment for streaming digital multimedia content in accordance with an embodiment of the present invention, wherein the server-side architecture is distributed among a plurality of interoperable modules. Those skilled in the art should recognize that the client-server arrangement 300 is one illustrative implementation involving the server node 110 and a client device described hereinabove with respect to FIG. 1 and FIG. 2. A streaming client application 302 executing on any appropriate digital multimedia device is operable to interact with a web server 306 with respect to user requests and user feedback provided via path 316. Associated with the client application 302 is a media player engine 304, which may be embodied in software, hardware, firmware, or any combination thereof, for playing back the streaming media received over a streaming session. Web server 306 includes logic structure and functionality to invoke a presentation description by making a metadata file creation request 318 to a server application module (AM) 308 that generates a Session Description Protocol (SDP) file for a particular playlist. In general, a presentation description may describe one or more presentations, each of which maintaining a common time axis. A single presentation may contain several media streams whose description includes encoding information, language, and other parameters that enable the client application to choose the most suitable combination of media. Where multiple media streams are involved, it is possible that they may be located on different media servers; for example, audio and video streams can be split across servers for load sharing.

By way of example, a server streaming module (SM) 310, associated content database 312 and a local content manager (LCM) 314 are representative of a media server for streaming digital multimedia to the client player engine 304 via a real-time media delivery path 324 that is effectuated via a transport protocol such as Real-time Transport Protocol (RTP). Streaming events are notified to the server AM 308 by the streaming module via path 322 and streaming session status updates are provided by the server AM module 308 to the web server 306 via path 320. The web server 306 is operable to interact with the LCM via a path 326 with regard to playlist and media content management and playlist identifiers (e.g., Uniform Resource Locators or URLs).

As alluded to hereinabove, control over the delivery of data with real-time properties (i.e., digital multimedia) in the client-server arrangement 300 may be effectuated by an application-level text-based protocol such as RTSP which is operable to control multiple data delivery sessions, provide a means for choosing delivery channels such as User Datagram Protocol (UDP) channels, multicast UDP channels, etc., as well as provide a means for choosing data delivery mechanisms based upon RTP. Since the teachings of the present patent disclosure are particularly exemplified within the context of RTSP messaging, a brief description thereof is set forth immediately below.

RTSP establishes and controls one or more time-synchronized streams of continuous media such as audio and video, wherein the set of streams to be controlled is defined by a presentation description. There is no notion of an RTSP connection; instead, a server maintains a logical session typically labeled by an identifier. In general, an RTSP session is not tied to a transport-level connection such as the Transmission Control Protocol (TCP). During an RTSP session, an RTSP client application may open and close a number of TCP transport connections to the server to issue RTSP requests. Alternatively, it may use a connectionless transport protocol such as UDP:

A "presentation" is a set of one or more streams presented to the client as a complete media feed, using presentation description information. In most cases within the RTSP context, this implies aggregate control of those streams, but not necessarily so. A presentation description contains information about one or more media streams within a presentation, such as the set of encodings, network addresses and other information about the content. Other Internet Engineering Task Force (IETF) protocols such as SDP use the term "session" to describe a live presentation. The presentation description may take several different formats, including but not limited to the SDP-based session description format alluded to hereinabove.

The streams controlled by RTSP may use RTP for data delivery, but the operation of RTSP does not depend on the transport mechanism used to carry continuous media. RTSP's syntax and operation are similar to that of the more familiar Hypertext Transfer Protocol (HTTP), although several important distinctions between the two exist. For example, both an RTSP server and client can issue requests, whereas HTTP is an asymmetric protocol in which the client issues requests and the server responds. Also, with respect to RTSP, data is typically carried out-of-band by a different protocol (e.g., RTP). The following operations are supported by RTSP: (i) retrieval of media from a media server; (ii) invitation of a media server to a conference; and (iii) addition of media to an existing presentation.

In terms of overall operation, each presentation and media stream may be identified by an RTSP URL. For example, the RTSP URL:

rtsp://media.example.com:554/twister/audiotrack identifies the audio stream within the presentation "twister", which can be controlled via RTSP requests issued over a TCP connection to port 554 of host <media.example.com>. As pointed out earlier, the presentation and the properties of the media are defined by a presentation description file, which may be obtained by a client application using HTTP or other means such as email and RSTP DESCRIBE requests, and may not necessarily be stored on the media server. The following table summarizes the RTSP method tokens that indicate the particular method to be performed on the resource identified in a request message:

TABLE I

| Method | Direction | Object |
|---|---|---|
| DESCRIBE | Client (C) to Server (S) | Presentation (P); Stream (S) |
| ANNOUNCE | C to S; S to C | P; S |
| GET_PARAMETER | C to S; S to C | P; S |
| OPTIONS | C to S; S to C | P; S |
| PAUSE | C to S | P; S |
| PLAY | C to S | P; S |
| RECORD | C to S | P; S |
| REDIRECT | S to C | P; S |
| SETUP | C to S | S |
| SET_PARAMETER | C to S; S to C | P; S |
| TEARDOWN | C to S | P; S |

Each of these methods, whether applied on a single stream or a group of streams (i.e., a presentation), is typically provided with a number of header fields that are used for further defining the RTSP transactions in a client-server arrangement. Additional details regarding these and related RTSP requirements may be found in IETF Request for Comments (RFC) 2326, "Real Time Streaming Protocol (RTSP)" by Schulzrinne et al. (dated April 1998), which is incorporated by reference herein.

It should be appreciated that RTSP is versatile enough to provide for extensions, either by way of extending existing methods with new parameters or by defining new methods that are designed to impart enhanced functionality. As will be seen below, the present patent disclosure provides a new method that enables increased playlist seeking capabilities with respect to server-side playlists within a client-server arrangement such as, e.g., the arrangement 300 described above.

Figure 4:
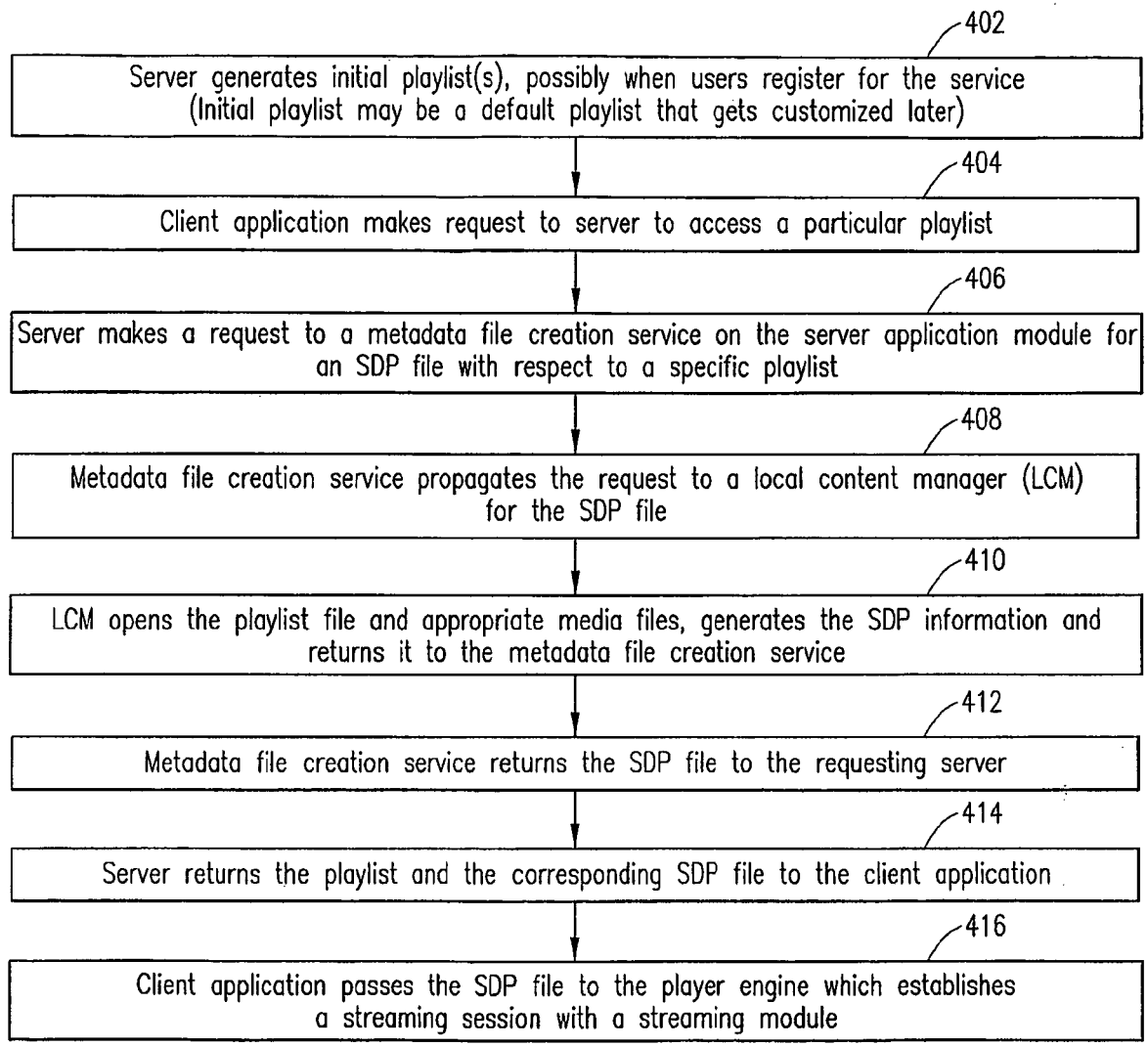
FIG. 4 is a flowchart of one aspect of operation with respect to the client-server arrangement shown in FIG. 3.

Referring now to FIG. 4, shown therein is a flowchart of one aspect of operation with respect to the client-server arrangement 300 shown in FIG. 3. The web server 306 is operable to generate initial playlists, possibly when users register for the service (block 402). In one implementation, the initial playlist may simply be a default playlist that gets customized later. The client application 302 makes a request to the web server 306 to access a particular playlist (block 404), whereupon the server 306 makes a request to a metadata file creation service on the server application module 308 for an SDP file with respect to a specific playlist (block 406). The metadata file creation service thereafter propagates the request to LCM 314 for the SDP file (block 408). Those skilled in the art should appreciate that the SDP file contains data that could have been obtained via an RTSP DESCRIBE request, as well as additional information, so the client application 302 does not have to issue a separate RTSP DESCRIBE request. Responsive to the SDP file, LCM 314 opens the playlist file and appropriate media file(s), generates the SDP information, and returns it to the metadata file creation service (block 410) which passes the SDP file to the requesting web server 306 (block 412). Subsequently, the web server 306 returns the playlist (generated previously) and the corresponding SDP file to the client application 302 executing on the digital multimedia device (block 414). The client application 302 passes the SDP file to the player engine 304 which establishes a streaming session with the streaming module 310 for accepting the delivery of selected media (block 416). Where audio files are involved, for example, they may be encoded in a number of ways, such as Advanced Audio Coding (AAC), Windows® Media Audio (WMA), MP3, etc.

In a further variation, LCM 314 might not be involved in generating an SDP file. Instead, the metadata file creation service makes a request directly to a streaming server (via RTSP DESCRIBE) to receive a base SDP description. Thereafter, the metadata file creation service modifies the received SDP description to make it appropriate for client consumption. Additionally, the playlist file is not necessarily delivered to the client application along with the SDP file in all cases. In one embodiment where the client application understands the syntax of the playlist file, a playlist may be provided in addition to the SDP file, thereby allowing a much richer user experience and interaction with the client. In the case where the client may be totally unaware of playlists altogether, it would receive only an SDP file.

Figure 5:
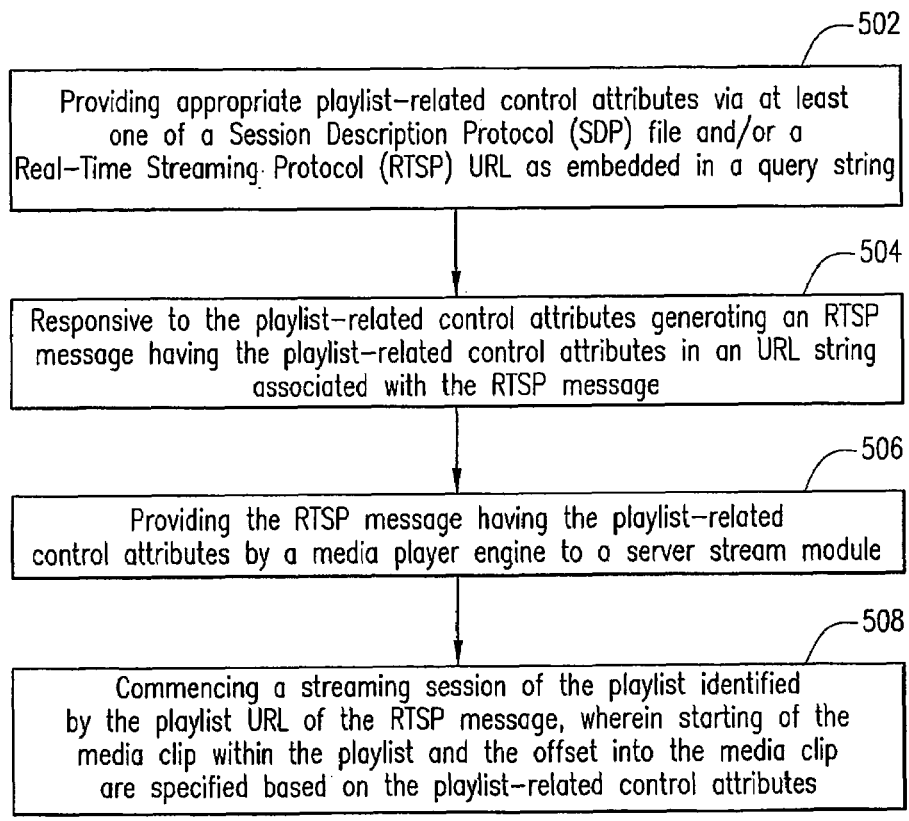
FIG. 5 is a flowchart of a scheme for effectuating playlist seeking capability in accordance with an embodiment of the present invention.

FIG. 5 is a flowchart of an embodiment of a scheme for effectuating playlist seeking capability in accordance with the teachings of the present invention wherein a user (i.e., media consumer) can start a playlist at any media clip therein. In one embodiment, appropriate playlist-related control attributes for a playlist are provided in an SDP file that is propagated to the client side (i.e., the client application and the associated media player engine). Alternatively, the playlist-related control attributes may be provided via an RTSP URL as embedded parameters in a query string (block 502). In other words, it should be appreciated that playlist sessions need not necessarily start with an SDP file. Rather, they can also start with simply an RTSP URL (e.g., embedded in a Web page). The metadata file creation service described previously may be suitably modified to support the generation of an RTSP URL with embedded playlist-related control attributes. In this scenario, the client makes a DESCRIBE request to the server and receives an appropriate SDP file in response. In either case, responsive to the received playlist-related control attributes, an RTSP message is provided to the SM module 310 by the player engine 304, wherein the message contains the playlist-related control attributes in a URL query string associated with the identified playlist (blocks 504 and 506). Depending on the SDP data (i.e., either through the SDP file or through the SDP data returned in response to an RTSP DESCRIBE request), the playlist query string attributes may be present in either the session-level or media-level URLs. Accordingly, as will be exemplified below, the playlist attributes in the media-level URLs may be carried in a SETUP request, whereas the session-level URL-based playlist attributes may be carried in other RTSP requests, with suitable modifications being provided to the server-side logic.

To support user control over the streaming experience, a clip index parameter (that indexes into the playlist for specifying a particular media clip) as well as an offset parameter (specifying the start time within the selected media clip) may be provided as the playlist-related control attributes of the RTSP message. In particular, an RTSP SETUP message may include these attributes in the URL query string associated therewith at the beginning of a streaming session in order to specify which media clip in the playlist the user wants to start from. Set forth below is an RTSP SETUP request in accordance with one embodiment:

SETUP <url>?<secure query string elements>&clipIndex=<index>&clipOffset=<offset> RTSP/1.0
CSeq: sequence number

```
Session: session id
Transport: transport information
``` where
url is the requested playlist file URL;
index is the index into the playlist identifying the specific clip (e.g. starting at fourth clip);
offset is the start time within the clip (i.e. 30 seconds into the clip).

In one implementation, the index parameter may be 0-based in the sense that a value of "0" indicates the first clip in the playlist, a value of "1" indicates the second clip in the playlist, and so on. The offset parameter may be provided as a Normal Play Time (NPT) timestamp in a sec.frac format, although other timestamp formats may used as well (e.g., SMPTE (Society of Motion Picture and Television Engineers) and hh:mm:ss:ff (hours:minutes:seconds:fractional_seconds) formats). Responsive to the RTSP message having the playlist-related control attributes, a streaming session with respect to the identified playlist may be commenced between the SM module and the player engine over suitable transport, wherein starting of a particular media clip within the playlist and an offset into the media clip are specified based on the playlist-related control attributes (block 508).

Those skilled in the art should recognize that in order to effectuate the playlist seeking control of the present disclosure, appropriate structures or logic modules in either software and/or firmware modifications and implementations may be provided at the client side as well as the server side of the exemplary streaming media architecture set forth herein. As alluded to previously, the metadata file creation service described above may be modified to include the capability such that the additional query string attributes may be placed in both the session-level control URL(s) as well as in media-level URL(s) in the generated SDP files. The interface to the metadata file creation service may be extended to add a new element containing the query string attributes. Consider the following example where the request to metadata file creation contains a list of new elements:

```
<queryStringList>
    <queryString>foo</queryString>
    <queryString>bar</queryString>
    <queryString>bam</queryString>
</queryStringList>
```

Since the metadata file creation service is operable to take each element in the list and append each to the end of the control URL query string, the resulting control URL in the SDP file would look like:
a=control:rtsp://host/path?foo&bar&bam In another example where the streaming is to begin at, e.g., the fifth media clip of a playlist with an offset of 35 seconds, the request to the metadata file creation service would contain the following:

```
<queryStringList>
    <queryString>clipIndex=4</queryString>
    <queryString>clipOffset=35.0</queryString>
</queryStringList>
```

Accordingly, the resulting control URL in the SDP file would appear as the following:

a=control:rtsp://host/path?clipIndex=4&clipOffset-35.0

It should be appreciated that because playlist-related query string attributes can be present in both the session- and media-level control URLs in the SDP file, these attributes may be present in all requests from the client when using SDP-based session establishment (e.g., SETUP, PLAY, PAUSE, etc.). In order that the logic at the server side is preferably backward-compatible, the SM may accept an RTSP request message with or without the additional playlist-related control attributes. If the SM receives the first SETUP message with the additional attributes, it will start the streaming session at the point defined by the new attributes. On the other hand, if no additional attributes are specified in the first SETUP message, the SM is operable to start the streaming session at the beginning of the first clip defined in the playlist (i.e., default mode). For any subsequent requests (i.e., PLAY or PAUSE) that may have the playlist query string attributes attached, the SM logic may ignore these attributes.

Figure 6:
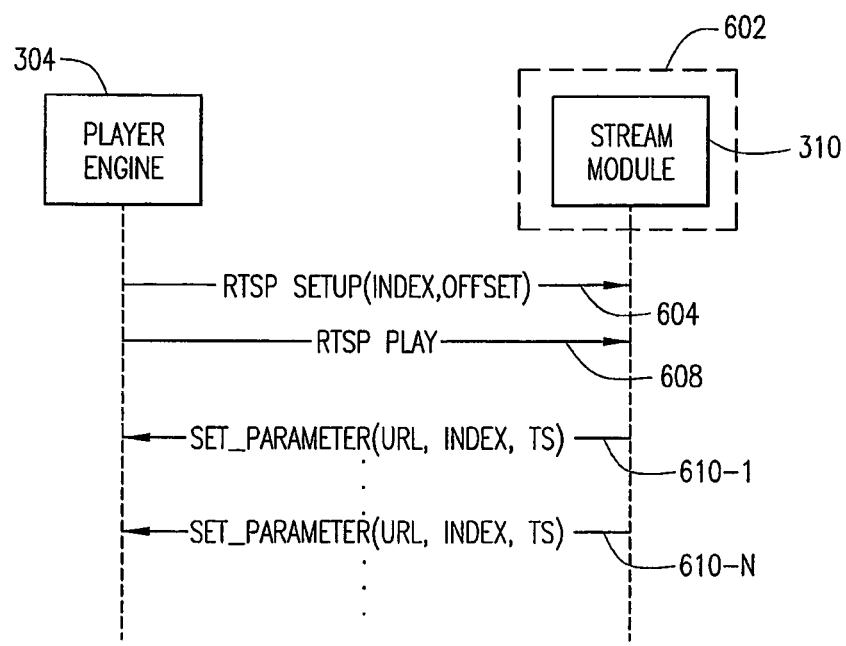
FIG. 6 depicts a message flow diagram associated with an embodiment for retrieving digital media content from a network node.

FIG. 6 depicts a message flow diagram associated with an embodiment for retrieving digital media content from a network node. As illustrated, player engine 304 is operable to issue an RTSP SETUP request 604 having a set of appropriate playlist-related control attributes (i.e., index and offset parameters) to SM 310 of an exemplary media network node 602. One of ordinary skill will recognize that network node 602 may be a depository of media comprised of various types (e.g., audio, video, and so on) that may be organized in some hierarchical manner. The physical content may be comprised of playlists and media clips generally. Exemplary logical content hierarchy associated with the digital media may comprise a plurality of primary level playlist identifiers, each of which may comprise references to one or more media clips and/or one or more additional playlists (i.e., secondary playlists). Each secondary playlist reference may further include references to additional media clip references and/or tertiary playlists, and so on, all arranged in a multi-level parent-child relationship.

After the issuance of RTSP SETUP request 604, an RTSP PLAY message 608 is transmitted to SM 310 by the player engine 304, which then effectuates a streaming data delivery session therebetween, starting at the selected clip and/or offset. Also, the server-side SM 310 is operable to send periodic messages (e.g., SET_PARAMETER messages 610-1 through 610-N) to the player engine 304, indicating a switch to a new media clip within the selected playlist or to a new playlist altogether (if so requested).

Based on the foregoing Detailed Description, it should be appreciated that the present patent disclosure advantageously provides the ability for a streaming client application to request a streaming server node to commence a streaming session at a particular clip within a media playlist and at a specific point within a clip. Although the invention has been described with reference to certain exemplary embodiments, it is to be understood that the forms of the invention shown and described are to be treated as exemplary embodiments only. Accordingly, various changes, substitutions and modifications can be realized without departing from the spirit and scope of the invention as defined by the appended claims.

What is claimed is:
1. A method for effectuating playlist seeking with respect to digital media content from a network node, comprising:
receiving, at a media player engine executing on a digital media device, a set of playlist-related control attributes associated with a playlist indicating an order for playback of a group of media clips via at least one of a

Session Description Protocol (SDP) file and a Real-Time Streaming Protocol (RTSP) Uniform Resource Locator (URL);

providing an RTSP message to a server stream module associated with said network node by the media player engine, said RTSP message containing selected ones of said set of the playlist-related control attributes in a URL query string associated with said RTSP message with respect to said playlist, said selected ones of said playlist-related control attributes including a clip index identifying a particular media clip within the group of media clips forming the playlist and an offset identifying a position within said particular media clip; and commencing a streaming session of said playlist identified in said RTSP message starting at said offset of said particular media clip within said playlist based on said selected ones of said set of the playlist-related control attributes being associated with said playlist and continuing with remaining media clips within said playlist based on said order being indicated by said set of playlist-related control attributes being associated with said playlist.

2. The method for effectuating playlist seeking with respect to digital media content from a network node as recited in claim 1, wherein said RTSP message provided by said media player engine comprises one of SETUP, PLAY, and PAUSE messages.

3. The method for effectuating playlist seeking with respect to digital media content from a network node as recited in claim 1, wherein said playlist is provided as part of a depository of said digital media content organized into a hierarchical arrangement having a plurality of levels.

4. The method for effectuating playlist seeking with respect to digital media content from a network node as recited in claim 1, wherein said particular media clip is identified by a clip index attribute of said playlist-related control attributes.

5. The method for effectuating playlist seeking with respect to digital media content from a network node as recited in claim 1, wherein said offset into said particular media clip is identified by a timestamp provided in said playlist-related control attributes, said timestamp having a format comprising one of a Normal Play Time (NPT) format, an SMPTE format, and an hh:mm:ss:ff format.

6. The method for effectuating playlist seeking with respect to digital media content from a network node as recited in claim 1, wherein said digital media device accesses said network node over at least one of a wireline network, a wireless network, and a cable network.

7. The method for effectuating playlist seeking with respect to digital media content from a network node as recited in claim 1, wherein said digital media device comprises at least one of: digital music players, digital video players, computers and handheld communication devices enabled to accept streaming media.

8. A digital media device operable to retrieve digital media content from a network node, comprising:

logic associated with a media player engine executing on said digital media device for generating a Real-Time Streaming Protocol (RTSP) message to said network node, said RTSP message containing a set of playlist-related control attributes in a Uniform Resource Locator (URL) query string with respect to a playlist identified in said RTSP message, said playlist indicating an order of playback of a group of media clips, said playlist-related control attributes including a clip index identifying a particular media clip within a group of media clips forming the playlist and an offset identifying a position within said particular media clip at which to commence streaming; and means for playing back said playlist identified in said RTSP message starting at said offset of said particular media clip within said playlist based on selected ones of said set of said playlist-related control attributes being associated with said playlist and continuing with remaining media clips within said playlist based on said order being indicated by said set of said playlist-related control attributes being associated with said playlist.

9. The digital media device operable to retrieve digital media content from a network node as recited in claim 8, wherein said RTSP message generated by said logic associated with said media player engine comprises one of SETUP, PLAY, and PAUSE messages.

10. The digital media device operable to retrieve digital media content from a network node as recited in claim 8, wherein said playlist is provided as part of a depository of said digital media content organized into a hierarchical arrangement having a plurality of levels.

11. The digital media device operable to retrieve digital media content from a network node as recited in claim 8, wherein said particular media clip is identified by a clip index attribute of said playlist-related control attributes.

12. The digital media device operable to retrieve digital media content from a network node as recited in claim 8, wherein said offset into said particular media clip is identified a timestamp provided in said playlist-related control attributes, said timestamp having a format comprising one of a Normal Play Time (NPT) format, an SMPTE format, and an hh:mm:ss:ff format.

13. The digital media device operable to retrieve digital media content from a network node as recited in claim 8, further including means for accessing said network node over at least one of a wireline network, a wireless network, and a cable network.

* * * * *